United States Patent [19]

Heise

[11] Patent Number: 5,296,545

[45] Date of Patent: Mar. 22, 1994

[54] SURFACE APPEARANCE AND PROCESSING CHARACTERISTICS FOR URETHANE-CATALYZED LOW PROFILE-MODIFIED POLYESTER-POLYURETHANE HYBRID RESINS

[75] Inventor: Michael S. Heise, Naperville, Ill.

[73] Assignee: Cook Composites and Polymers, Port Washington, Wis.

[21] Appl. No.: 913,300

[22] Filed: Jul. 14, 1992

[51] Int. Cl.$^5$ .................. C08L 67/06; C08L 75/04
[52] U.S. Cl. .................................... 525/28; 525/55; 525/36; 525/440; 525/445
[58] Field of Search .................. 525/28, 440, 445

[56] References Cited

U.S. PATENT DOCUMENTS

| | | | |
|---|---|---|---|
| 4,280,979 | 7/1981 | Dunleavy et al. | 264/157 |
| 4,296,020 | 10/1981 | Magrans, Jr. | 260/37 N |
| 4,316,835 | 2/1982 | Gardner | 260/40 R |
| 4,361,623 | 11/1982 | Newkirk et al. | 428/394 |
| 4,396,729 | 8/1983 | Dominquez et al. | 521/51 |
| 4,433,067 | 2/1984 | Rice et al. | 521/51 |
| 4,584,325 | 4/1986 | Smith | 521/99 |
| 4,822,849 | 4/1989 | Vanderlaan | 525/17 |
| 4,868,231 | 9/1989 | Lenke et al. | 523/512 |
| 4,880,872 | 11/1989 | Thomas | 525/43 |
| 4,943,607 | 7/1990 | Tanisake et al. | 523/500 |
| 4,994,543 | 2/1991 | Nakane et al. | 528/83 |
| 5,047,455 | 9/1991 | Hesse et al. | 523/508 |
| 5,153,261 | 10/1992 | Brooks | 525/28 |
| 5,159,044 | 10/1992 | Bogner | 528/75 |

FOREIGN PATENT DOCUMENTS 2301691 1/1973 Fed. Rep. of Germany .

OTHER PUBLICATIONS

Edwards "Handling and Physical Properties of Hybrid Polyesters", 39th Conf. Reinforced Plastics/Comp Inst. Jan. 1984.
U.S. Ser. No. 07/616,212, Sheet Molding Cmpds. Having Improved Viscosity: Bogner, filed Nov. 20, 1990.
U.S. Ser. No. 07/677,632; Flame Retardant Polyester-PU Hybrid Resin Comps.; Sinclair; filed Mar. 28, 1991.
U.S. Ser. No. 07/575,069; Polyester-PU Hybrid Resin Molding Comps; Brooks; filed Aug. 30, 1990.
U.S. Ser. No. 07/913,302; Polyester-PU Hybrid Resins Containing . . . Heise et al.; filed Jul. 14, 1992.
U.S. Ser. No. 07/913,301; Polyester-PU Hybrid Resin Comps. Containing . . . Heise et al.; filed Jul. 14, 1992.

Primary Examiner—James J. Seidleck
Assistant Examiner—Mary Critharis
Attorney, Agent, or Firm—Whyte Hirschboeck Dudek

[57] ABSTRACT

Urethane-catalyzed polyester-polyurethane hybrid resin molding compositions are prepared using a low profile additive to provide glass-reinforced articles that have improved surface profiles and improved processability compared to commercial low profile-modified unsaturated non-hybrid polyester resins.

10 Claims, No Drawings

SURFACE APPEARANCE AND PROCESSING CHARACTERISTICS FOR URETHANE-CATALYZED LOW PROFILE-MODIFIED POLYESTER-POLYURETHANE HYBRID RESINS

This invention relates to low profile-modified hybrid resin molding compositions which contain a urethane catalyst. More specifically, this invention relates to urethane-catalyzed polyester-polyurethane hybrid resin molding compositions prepared using a low profile additive to provide glass-reinforced articles that have improved surface profiles and improved processability compared to commercial low profile-modified unsaturated non-hybrid polyester resins.

BACKGROUND OF THE INVENTION

Polyester-polyurethane hybrid resins are well-known in the art of thermoset molding compositions. The term hybrid describes a single, new type of polymer that is formed by the incorporation of the chemical groups and the properties of two different polymers, namely polyurethanes and unsaturated polyesters. Hybrid resins build molecular weight and toughness as they cure through the urethane chain-extension reaction, which occurs between the hydroxyl end groups on the polyester polyol and the isocyanate groups. Crosslinking occurs between the unsaturation in the polyester backbone and the styrene monomer, adding stiffness and thermal resistance. Thus, a unique blend of properties is obtained that cannot be achieved with either type of polymer alone. The hybrid resins are normally tougher than non-hybrid polyesters and stronger, stiffer and less expensive than polyurethanes. Polyester-polyurethane hybrid resins typically comprise a hydroxyl-terminated unsaturated polyester polyol, an ethylenically unsaturated monomer, such as styrene, and a polyisocyanate. Polyester-polyurethane hybrid resins can be easily adapted to many common thermoset molding techniques employed in both the polyurethane and unsaturated polyester industries. Such hybrid resins are generally supplied as a two component system having an Aside and a B-side. The Aside typically contains the polyisocyanate and a free radical initiator, while the Bside typically contains the hydroxyl-terminated unsaturated polyester polyol/styrene solution and, optionally, fillers and/or additives.

One key problem that occurs during the hybrid cure is resin shrinkage which results in dimensional stability problems, such as warpage. Unacceptable surface appearances such as waviness or roughness results when hybrids are reinforced with fibers, such as glass. The resin shrinks around the glass fibers, allowing the fibers to show through the surface of the molded article. This phenomenon is commonly termed glass print-through. It is desirable to reduce the shrinkage and improve the surface appearance (profile) of molded articles manufactured from hybrid resins.

U.S. Pat. No. 4,822,849, teaches reducing the shrinkage of hybrid resins by reducing both the styrene level and unsaturation level within the hybrid. Lower shrinkage is achieved by reducing the crosslink density, but this may lead to reduced thermal properties of the hybrid resin. U.S. Pat. No. 4,280,979, also describes the preparation of unsaturated polyester polyols, which can be reacted with a polyisocyanate and a polymerizable ethylenically unsaturated monomer to produce polyurethane/vinyl copolymers. Both patents are incorporated herein by reference.

Low profile additives (LPA's) have been added to unsaturated polyester resins to control shrinkage and improve dimensional stability and surface smoothness (profile). The LPA tends to phase separate from the polyester during cure, resulting in thermoplastic domains that induce stresses within the system. These stresses lead to the formation of internal imperfections, such as microcracks and microvoids, in molded products containing the LPA. The internal imperfections are beneficial because they reduce the amount of shrinkage that occurs during cure. Typical LPA-modified polyesters may contain up to 60 weight percent styrene monomer, and typically have high levels of unsaturation (greater than 5.5 moles unsaturation per kilogram of polyol). When there is more than one mole of styrene per equivalent of unsaturation in the polyester, the product tends to have high shrinkages; however, this shrinkage is counterbalanced by the micro-imperfections developed during the phase separation of the thermoplastic from the thermoset.

Severe glass print-through occurs in the typical conventional composite hybrid molding compositions. The failure of conventional LPA technology in commercial hybrid resins has been attributed to several factors. First, low levels of unsaturation in the polyester contribute to slow reactivity of the hybrid system: fast reactivity is considered to be one of the keys to achieving effective low profiling behavior. Also, the polyurethane reaction is considered to be slower than the unsaturated polyester crosslinking reaction; consequently, hybrid reactivity was always assumed to be significantly less than that for the corresponding polyester system. Second, the hybrid resin has a high matrix toughness compared to the unsaturated (non-hybrid) polyester resins because of the polyurethane component; therefore, the hybrid resin will not form microcracks or craze as easily. This cracking is essential for reducing shrinkage in a low profile system. And third, the low profile additive is highly soluble in the isocyanate component and, thus, is less likely to phase separate and low profile during the cure. To date, there have been no reports of observing effective low profiling behavior in hybrid resins.

Typical commercial hybrids possess low levels of unsaturation in the polyester (less than 4.0 moles/Kg) which typically results in slow reactivity. High levels of unsaturation and fast reactivity are generally believed to be necessary for achieving effective phase separation of the low profile additive. The unsaturation level in a polyol can be increased by substituting an unsaturated anhydride or acid for the saturated anhydride or acid in the polyol preparation. The reactivity of the polyol can also be increased by increasing the concentration of the fumarate (trans) isomer of unsaturation compared to the maleate (cis) isomer.

We have found that urethane catalysis of low profile-modified unsaturated polyester-polyurethane hybrid compositions yields improved processability and provides improved surface appearance (profile) in molded articles that exceeds the processing and surface appearance properties offered by traditional low profile-modified, non-hybrid unsaturated polyester resin systems. This advantage offered by the urethane-catalyzed, hybrid systems is unique and unexpected since it was previously thought that hybrids could not yield effective low profiling behavior. The rate of the crosslinking reaction has been assumed to be critical for achieving the phase separation of the low profile additive. The polyurethane reaction is predominantly a chain extension (non-crosslinking) process and was assumed to prohibit the low profiling behavior in hybrid resins. We have observed, however, that accelerating the polyurethane reaction is critical for achieving molded parts with superior surface appearance properties.

SUMMARY OF THE INVENTION

Briefly, the polyester-polyurethane molding compositions of the present invention are molded products formed by the reaction of an A-side composition and a B-side composition. The urethane-catalyzed, polyester-polyurethane hybrid resin molding composition of the present invention is formed by contacting:
(A) an A-side composition comprising a polyfunctional isocyanate compound and a free radical polymerization catalyst with,
(B) a B-side composition wherein the B-side composition comprises:
  (1) a urethane catalyst, and
  (2) an ethylenically unsaturated monomer solution having dissolved therein from about 40 wt. % to about 90 wt. % based on total B-side, of a substantially water-free, unsaturated polyester polyol which is the reaction product of:
    (a) an unsaturated dicarboxylic acid, dianhydride, anhydride, or derivative thereof, and
    (b) a saturated dicarboxylic acid, dianhydride, anhydride or derivative thereof, in amounts such that the level of unsaturation is greater than about 2.5 moles/Kg, preferably between 4.0 to 5.5 moles/Kg, at fumarate levels of greater than 95%, and
    (c) a diol composition which is present in a molar excess to achieve a polyol equivalent weight ranging from about 250 to about 1000,
said polyester-polyurethane hybrid resin molding composition further comprising a low profile additive and further wherein the polyol resin composition has an acid number less than five. A promoter for the vinyl polymerization can also be included.

The polyols used in this invention should have an acid number less than five, and preferably less than two. Furthermore, the polyols used in this invention should have equivalent weights of between 250 and 1 000, and preferably between about 250 and about 500. Low equivalent weight polyols are lower in viscosity and offer processing advantages. Also, more hybrid character is introduced into the polymer backbone through the formation of urethane linkages when a lower equivalent weight polyol is used; this will improve the overall matrix toughness.

The B-side composition can be supplied separately and is useful for the preparation of the molding compositions of the present invention.

The polyester-polyurethane molding compositions of the invention can be processed into molded products formed by the reaction of an A-side composition and a B-side composition. The process for making improved surface polyester-polyurethane resin articles comprises reacting:
(A) an A-side composition comprising a polyfunctional isocyanate and a free radical polymerization catalyst; and
(B) a B-side composition wherein the B-side composition comprises: a urethane catalyst and an ethylenically unsaturated monomer solution having dissolved therein from about 40 wt. % to about 90 wt. % based on total B-side, of a substantially water-free, unsaturated polyester polyol which is the reaction product of:
  (a) an unsaturated dicarboxylic acid, dianhydride, anhydride, or derivative thereof, and
  (b) a saturated dicarboxylic acid, dianhydride, anhydride or derivative thereof, in amounts such that the level of unsaturation is greater than about 2.5 moles/Kg, preferably between 4.0 to 5.5 moles/Kg, at fumarate levels of greater than 95%, and
  (c) a diol composition which is present in a molar excess to achieve a polyol equivalent weight ranging from about 250 to about 1000,
said polyester-polyurethane hybrid resin molding composition further comprising a low profile additive and further wherein the polyol resin composition has an acid number less than five; a promoter can also be included.

The invention further comprises a polyester-polyurethane hybrid resin molding system which is provided as an A-side composition and a B-side composition, as defined above. The end user of the system reacts the A and B-side compositions at the time of molding to obtain molding compositions and molded articles.

The potential surface appearance benefits of hybrid/low profile additive (LPA) systems limited by the slow reactivity of the polyurethane reaction. Since the LPA is soluble in the isocyanate component, slow isocyanate conversion at the mold surface results in areas of poor surface appearance by allowing the LPA to remain soluble in the isocyante phase and consequently, the LPA does not become part of the curing polymer network. We have found that the rate of isocyanate conversion can be increased by adding urethane catalysts to the resin formulation. This catalyst improved the low profiling behavior and the surface appearance of the molded product. Furthermore, the overall in-mold reactivity was greatly increased with the catalyst; this increase in reactivity leads to shorter cycle times and improved physical properly development. Thus, molding advantages can be realized for low profile-modified hybrid resins that are not possible for conventional low profile-modified unsaturated polyester resins.

DETAILED DESCRIPTION OF THE INVENTION

For the purpose of this disclosure, the term "cure" or "curing" means the transformation of the hybrid resin system from a liquid to a gel or solid state. This curing occurs at the time of molding by crosslinking of the reactive sites in the hybrid system, including the reaction of the isocyanate with active hydrogen-containing compounds. Further, the curing of the hybrid resin system occurs via the vinyl addition reaction between the ethylenically unsaturated monomer and the unsaturated polyester polyol. Depending on the catalyst and catalyst levels employed, curing can optimally occur at the time of molding at temperatures of about 25° C. to about 150° C. for a time of 30 sec. to about 24 hrs.

As used herein, the term "stoichiometric index" refers to the value obtained by dividing the number of active NCO groups of the isocyanate compound by the number of OH groups in the polyester polyol.

The term "substantially water-free", as used herein, means a water content of less than 1 percent, preferably less than 0.2 percent and most preferably less than 0.05 percent.

The term "polyfunctional", as used herein, is intended to include functionalities of two or greater.

The ethylenically unsaturated monomer used in the composition of the invention can be any ethylenically unsaturated monomer capable of cross-linking the unsaturated polyester polyol via vinyl addition polymerization. Examples of useful ethylenically unsaturated monomers are styrene, o-, m-, p-methyl styrene, methyl acrylate, methyl methacrylate, t-butylstyrene, divinyl benzene, diallyl phthalate, triallyl cyanurate, and mixtures thereof. The preferred monomer is styrene because it provides an economical monomer solution.

The unsaturated polyester polyol in the present invention has at least one dicarboxylic alkene moiety and is preferably an oligomer of an alpha, beta-, ethylenically unsaturated dicarboxylic acid compound obtained by the condensation reaction of one or more of (1) a saturated di- or polycarboxylic acid or anhydride (examples of suitable saturated acids or anhydrides include phthalic acid or anhydride, isophthalic acid, terephthalic acid, adipic acid, glutaric acid, succinic acid or anhydride, and the like); (2) an unsaturated di- or polycarboxylic acid or anhydride (suitable $\alpha, \beta$-unsaturated dicarboxylic acids or anhydrides include maleic acid or anhydride, fumaric acid, itaconic acid, and other $\alpha, \beta$-unsaturated diacids, and the like); and (3) a diol or composition of diols (suitable diols include neopentyl glycol, ethylene glycol, diethylene glycol, triethylene glycol, propylene glycol, dipropylene glycol, 1,4-butanediol, polyethylene glycols, glycerol, mannitol, 1,2-propanediol, pentaerythritol, 1,6-hexanediol, 1,3-butylene glycol, 2-methyl-1,3-propanediol, and the like).

One of the proposed reasons that commercial hybrid resins have not been successfully low-profiled has been attributed to the low reactivity of the unsaturated polyester portion of the hybrid resin. One method to increase the reactivity is to increase the unsaturation in the polyol to high levels. The higher levels of unsaturation are achieved by substituting unsaturated diacids and dianhydrides for the corresponding saturated diacids and dianhydrides. High fumarate levels of greater than 95% may be achieved by several methods, including (1) accelerating the isomerization with morpholine, (2) starting with fumaric acid, or (3) altering the addition procedures to take advantage of the equilibrium favorability of the fumarate isomer.

The isocyanate compound, typically referred to as a polyisocyanate, must have at least two functional (polyfunctional) groups and be capable of reacting with the polyester polyol. Examples of suitable isocyanate compounds include 2,4- and 2,6-toluene diisocyanate (TDI), 4,4'-diphenylmethylene diisocyanate (MDI), polymethylene polyphenyl isocyanate (PMPPI), dianisidine diisocyanate, metaphenylene diisocyanate, isophrone diisocyanate, hexamethylene diisocyanate, and mixtures thereof. The preferred isocyanates are liquefied MDI's or PMPPI's because of their low viscosity, ease of handling, and relative low cost.

The ratio of active isocyanate groups to active hydroxyl groups in the polyester polyol can range from about 0:1.5 to about 1:1 with the preferred ratio being about 1:1, which is a stoichiometrically balanced system. The NCO/OH balanced system promotes complete reactivity while maximizing the polyurethane or hybrid characteristics of the molding system.

The removal of water is important for two reasons. First, the removal of water is necessary to obtain the desirable molecular weight of the polyester polyol. Second, the presence of water in the hybrid resins of the invention will cause undesirable foaming.

The polyols used in this invention have an acid number less than five, and preferably less than about two. Acid number is an indication of the amount of residual carboxylic acid in the polyester polyol. Carboxylic acids can react with the isocyanates during the urethane reaction, forming carbon dioxide, which results in undesirable foaming. Further, the polyols used in this invention have equivalent weights of between about 250 and about 1000, and preferably between about 250 and about 500. This range is desirable to insure lower viscosity and the optimal hybrid character in the cured hybrid polymer.

The free radical polymerization catalysts useful in producing the molding compositions of this invention are vinyl polymerization catalysts such as peroxides, persulfides, perborates, percarbonates, and azo compounds or any other suitable catalyst capable of catalyzing the vinyl polymerization of the polyester polyol and/or the ethylenically unsaturated monomer. Illustrative of a few such catalysts are benzoyl peroxide (BPO), tertiarybutyl peroxybenzoate, 2,2'-azo-bis-isobutyronitrile, lauryl peroxide, di-tertiarybutylperoxide, diisopropyl peroxide carbonate and tertiarybutylperoxy-2-ethylhexanoate, and the like. These catalysts are typically added at levels ranging from about 0.5 to about 10.0 parts per hundred based on polyol resin (pphr).

Promoters for the vinyl polymerization can also be used in combination with vinyl polymerization peroxide catalysts to control the rate of free radical initiation. Suitable benzoyl peroxide promoters include N,N-diethylaniline, N,N-dimethyl para-toluidine, and other tertiary aromatic amines, and the like.

Urethane catalysts that are useful in catalyzing the polyurethane formation in producing the hybrid polymer in accordance with this invention include (a) tertiary amines such as N, N-dimethylcyclohexylamine, (b) tertiary phosphines such as trialkylphosphines, (c) strong bases such as alkali and alkaline earth metal hydroxides, alkoxides, and phenoxides, (d) acidic metal salts of strong acids such as ferric chloride, (e) organotin compounds such as dibutytin dilaurate, and (f) cyclic amines such as 1,5-diazabicyclo(5.4.0)undec-5-ene. Other commonly used catalysts for making poluyurethanes can be found in U.S. Pat. Nos. 4,280,979 and 4,598,103, incorporated herein by reference.

Suitable low profile additives (LPA's) are thermoplastic polymers such as, for example, vinyl acetate polymer, acrylic polymer, polyurethane polymer, polystyrene, butadiene styrene copolymer, saturated polyester, polycaprolactone, and the like. These polymers typically have non-reactive end groups, are of high molecular weights (10,000 to 200,000) and are typically supplied in a vinyl monomer such as styrene to reduce the viscosity of the thermoplastic to a workable range.

The LPA solution can be incorporated into the A-side (isocyanate) or B-side (polyol). Incorporation into the A-side is preferred because it has been found to have better storage stability. This is an advantage of the hybrid system compared with non-hybrid unsaturated polyester polyols. Typical LPA weight loadings are from about 1 wt. % to about 40 wt. % based on the weight of polyol, preferably from about 5 wt. % to about 20 wt. %.

The hybrid resins of the invention can be fabricated using liquid reactive molding or compression molding techniques commonly employed in the unsaturated polyester and polyurethane industries. Liquid molding is the direct injecting or pouring of a hybrid resin into a mold (closed molding) or onto a mold (open molding). In liquid injection closed molding, the polyisocyanate and hydroxy-terminated polyester in the monomer solution (polyol) are fed separately into the chamber of a mixing head where the two components are mixed. Upon mixing, the hybrid reaction begins instantaneously whereby the rate of reactivity is dependent on the catalyst and temperature used. The hybrid liquid stream is injected between mold halves wherein the reactions between the various components of the hybrid resin system continue. After sufficient time for cure, the part is removed from the mold. The part can be used as molded or be further post-annealed in an oven. Common liquid closed molding techniques which are well known in the art include resin transfer molding (RTM), reaction injection molding (RIM) and structural reaction injection molding (S-RIM).

By adjusting the stoichiometry and/or the use of urethane and polyester catalysts, the gel time of the in situ hybrid can be adjusted from about 30 seconds to about 20 minutes. The gel time will dictate the time required between mixing the two components and injecting the resinous material into the mold.

Various organic or inorganic fibers or fillers can be added to improve the reinforcing properties of the hybrid and/or reduce its cost. Such organic fibers include polyacrylonitrile fibers (PAN), pitch-based carbon fibers, aromatic polyamide fibers, liquid crystal polyester fibers, or any polymeric fiber that improves the properties of the hybrid.

Inorganic fibers include glass and whiskers, while inorganic fillers include such materials as talc, calcium carbonate, silica beads, calcium sulfate, aluminum trihydrate, ammonium polyphosphate, and the like. While the amounts of filler will vary depending on the application, typical additions can range from about 0 to about 200 parts filler based on 1 00 parts of the hybrid system of the invention. Typically, inorganic fibers are added to improve the reinforcing properties; they can be added in amounts varying from about 0 to about 50 wt. % based on total polyester-polyurethane hybrid resin system.

In summary, the preferred molding compositions comprise an A-side and a B-side wherein the A-side composition comprises the polyfunctional isocyanate compound and a free radical polymerization catalyst and optionally, the LPA. The ratio of active isocyanate groups to active hydroxyl groups in the polyester polyol can range from about 0:1.5 to about 1:1 with the preferred ratio being about 1:1, which is a stoichiometrically balanced system. The NCO/OH balanced system promotes complete reactivity while maximizing the polyurethane or hybrid characteristics of the molding system. The free radical polymerization catalysts can be peroxides, persulfides, perborates, percarbonates, and azo compounds or any other suitable material capable of catalyzing the vinyl polymerization between the unsaturation in the polyester polyol and the ethylenically unsaturated monomer. These catalysts are typically added at levels ranging from about 0.5 to about 10.0 parts per hundred based on polyol resin (pphr).

The B-side composition comprises:
(1) a urethane catalyst,
(2) an ethylenically unsaturated monomer solution having dissolved therein from about 40 wt. % to about 90 wt. % based on total B-side, of a substantially water-free, unsaturated polyester polyol which is the reaction product of:
  (a) an unsaturated dicarboxylic acid, dianhydride, anhydride, or derivative thereof, and
  (b) a saturated dicarboxylic acid, dianhydride, anhydride or derivative thereof, in amounts such that the level of unsaturation is greater than about 2.5 moles/Kg, preferably between 4.0 to 5.5 moles/Kg, at fumarate levels of greater than 95%, and
  (c) a diol composition which is present in a molar excess to achieve a polyol equivalent weight ranging from about 250 to about 1000, said polyester-polyurethane hybrid resin molding composition further comprising a low profile additive and further wherein the polyol resin composition has an acid number less than five.

The B-side composition can also include a free radical inhibitor and a promoter for the vinyl polymerization catalyst. These inhibitors and promoters control the role of the free radical catalyst initiation and, therefore, control the processability (gel time) and rate of cure.

The present invention is further illustrated by the following examples which are not, however, to be construed as limitations thereof.

EXAMPLES

Preparation of Unsaturated Polyester Polyols

Unsaturated polyester polyols which were used to prepare the hybrid resin molding compositions of the invention were prepared as follows:

Unsaturated polyester polyols were prepared by charging the reactants in Table I into a standard four-liter, four-neck reaction kettle equipped with a mechanical stirrer, thermometer, a partial condenser comprising a glass column packed with Raschig rings, a total condenser and receiver. This apparatus was mounted in an electric heating mantle with a temperature control device. For each run the entire reaction was carried out under an inert nitrogen atmosphere in which the nitrogen was passed through a rotameter and into the reaction medium near the mechanical stirrer. The reactants were heated slowly until the mixture could be agitated. The reactants were further heated until an overhead temperature of about 98°-100° C. was maintained. The reaction temperature at which water was liberated was about 150° C. Water was continuously removed from the reaction medium through the condenser system. The resin was heated to about 232° C. and held until the acid number was reduced to two or less, but more preferably, one or less.

The resin was cooled to 120° C., hydroquinone was added to the polyol, and the inhibited polyol was added to cool styrene monomer inhibited with 1,4-napthaquinone and p-benzoquinone. The resulting polyols were approximately 80% non-volatile material (NVM). Typical liquid properties of polyols are shown in Table II. Typical water content of the polyester polyols used in the invention was less than 1 wt. % based on total B-side, preferably less than 0.2 wt. %, and most preferably less than 0.05 wt. %. The removal of water was important for two reasons. First, the removal of water was necessary to obtain the desirable molecular weight of the polyester polyol. Second, the presence of water in the hybrid resins of the invention could cause undesirable foaming.

Typical molecular weights of the polyester polyols (on a solid basis) useful in the instant invention are from about 500 g/mole to about 2000 g/mole, and preferably between about 500 g/mole and about 1 000 g/mole. If the polyol is difunctional, the equivalent weight of the polyol is half the molecular weight, while polyfunctional polyols would have equivalent weights equal to the molecular weight divided by the OH functionality of the polyol.

TABLE I

| Polyester Polyol Formulations | | |
| --- | --- | --- |
| | Polyol 1 | Polyol 2 |
| REACTANTS | | |
| Fumaric Acid, moles | 1.00 | 1.00 |
| Ethylene Glycol, moles | 0.66 | — |
| 2-Methyl-1,3-Propanediol, moles | 0.66 | — |
| Diethylene Glycol, moles | — | 0.98 |
| Neopentyl Glycol, moles | — | 0.33 |
| Di-n-butyl Tin Maleate, ppm | 250 | 250 |
| INHIBITORS | | |
| Hydroquinone, ppm | 150 | 150 |
| 1,4-Naphthoquinone, ppm | 75 | 75 |
| p-Benzoquinone, ppm | 100 | 100 |

TABLE II

| Typical Liquid Resin Properties of Polyols | | |
| --- | --- | --- |
| Reactants | Polyol 1 | Polyol 2 |
| Degree of unsaturation (mol/kg) | 5.5 | 4.6 |
| Fumarate Content (%) | >95 | >95 |
| Acid Number, solid basis (mg KOH/g) | 0.71 | 0.74 |
| OH Number, solid basis (mg KOH/g) | 171 | 119 |

*The degree of unsaturation was calculated by dividing the weight of the polyester into the moles of maleic anhydride. The data was normalized to 1000 g of polyol. The acid number and OH number are determined by titration.

EXAMPLE 1

Preparation of Polyol 1

This example describes the preparation of a 2-methyl-1,3-propanediol and ethylene glycol-based polyol that has a high level of unsaturation, a high fumarate content, and high solubility characteristics.

Following the procedure described in the section on polyol preparation, an unsaturated polyester polyol was synthesized from the following starting materials: fumaric acid (1.00 mole), ethylene glycol (0.66 mole), and 2-methyl-1,3-propanediol (0.66 moles). The resulting polyol contained 5.5 moles of unsaturation per Kg of polyol, had an acid number (solids basis) of 0.7 mg KOH/g, a hydroxyl number (solids basis) of 171 mg KOH/g. The polyol had a high (greater than 95%) fumarate content and was soluble in styrene at a level of 80% solids. The fumarate content was determined by proton NMR.

EXAMPLE 2

Preparation of Polyol 2

This example describes the preparation of a neopentyl glycol and diethylene glycol-based polyol that has a high level of unsaturation, a high fumarate content, and high solubility characteristics.

Following the procedure described in the section on polyol preparation, an unsaturated polyester polyol was synthesized from the following starting materials: fumaric acid (1.00 mole), diethylene glycol (0.98 mole), and neopentyl glycol (0.33 moles). The resulting polyol contained 4.6 moles of unsaturation per Kg of polyol, had an acid number (solids basis) of 0.7 mg KOH/g, a hydroxyl number (solids basis) of 119 mg KOH/g. The polyol had a high (greater than 95%) fumarate content and was soluble in styrene at a level of 80% solids.

EXAMPLE 3

Polyol 1—Catalyzed Hybrid Resin Molding Composition

This example outlines the preparation of a urethane-catalyzed hybrid resin composition based on Polyol 1 which contains a low profile additive.

The B-side was prepared using Polyol 1 described in Example 1. To 36.13 g of polyol was added a total of 36.12 g styrene monomer to achieve the target nonvolatile polyol solids content (NVM) of approximately 50%. N,N-diethylaniline (0.43 g) was mixed into the polyol to promote the polyester reaction and p-benzoquinone (0.03 g) was added to delay the initiation of the free radical reaction. The low profile additive was polyvinyl acetate which had a weight-average molecular weight of 80,000 to 100,000: 8.67 g of LPA (solids basis) was added to the polyol. The LPA was added as a 40 wt % solution in styrene; the styrene was adjusted to achieve the target NVM for the polyol. A urethane catalyst (0.29 g) was also added to the B-side. This catalyst is a heat-activated, delayed-action co-catalyst based on 1,5-diazabicyclo(5.4.0)undec-7-ene was used. This catalyst is available from Air Products and Chemicals, Inc. under the tradename POLYCAT® SA-102. After mixing the B-side, the sample was allowed to deaerate for 10 minutes.

The A-side was prepared by adding benzoyl peroxide (1.45 g ) to PAPI 2027 isocyanate component (15.44 g). PAPI 2027 is a polymethylene polyphenylisocyanate (PMPPI). PAPI 2027 is characterized as having an NCO functionality of 2.7, an isocyanate equivalent weight of 134.0 g/equivalent of NCO, a viscosity at 25° C. of 180 cps, and a density at 25° C. of 1.23 g/ml.

These weights insured that A-side and B-side would be combined stoichiometrically. The stoichiometric amount was obtained by adding an equal mole equivalent of the polyisocyanate to an equal mole equivalent of polyol such that the ratio of NCO:OH was 1.0.

COMPARATIVE EXAMPLE A

Polyol 1—Hybrid Resin Molding Composition

This example outlines the preparation of a hybrid resin composition based on Polyol 1 which contains a low profile additive but does not contain a urethane catalyst.

The B-side was prepared using Polyol 1 described in Example 1. To 36.13 g of polyol was added a total of 36.25 g styrene monomer to achieve the target nonvolatile polyol solids content (NVM) of approximately 50%. N,N-diethylaniline (0.43 g) was mixed into the polyol to promote the polyester reaction and p-benzoquinone (0.03 g) was added to delay the initiation of the free radical reaction. The low profile additive was polyvinyl acetate which had a weight-average molecular weight of 80,000 to 100,000: 8.70 g of LPA (solids basis) was added to the polyol. The LPA was usually added as a 40 wt % solution in styrene; the styrene was adjusted to achieve the target NVM for the polyol. After mixing the B-side, the sample was allowed to deaerate for 10 minutes.

The A-side was prepared by adding benzoyl peroxide (1.45 g) to PAPI 2027 isocyanate component (1 5.44 g). These weights insured that A-side and B-side would be combined stoichiometrically. The stoichiometric amount was obtained by adding an equal mole equivalent of the polyisocyanate to an equal mole equivalent of polyol such that the ratio of NCO:OH was 1.0.

COMPARATIVE EXAMPLE B

Polyol 1—Polyester (non-Hybrid) Resin Molding Composition

This example outlines the preparation of a unsaturated polyester resin composition based on Polyol 1 which contains a low profile additive but contains no isocyanate component or urethane catalyst.

Comparative Example B was prepared using Polyol 1 described in Example 1. To 42.87 g of polyol was added a total of 42.87 g styrene monomer to achieve the target nonvolatile polyol solids content (NVM) of approximately 50%. N,N-diethylaniline (0.51 g) was mixed into the polyol to promote the polyester reaction and p-benzoquinone (0.03 g) was added to delay the initiation of the free radical reaction. The low profile additive was polyvinyl acetate which had a weight-average molecular weight of 80,000 to 100,000: 10.29 g of LPA (solids basis) was added to the polyol. The LPA was usually added as a 40 wt % solution in styrene; the styrene was adjusted to achieve the target NVM for the polyol. After mixing the polyol composition, the sample was allowed to deaerate for 10 minutes.

The benzoyl peroxide (1.71 g) was added and mixed into the polyol composition immediately prior to molding.

EXAMPLE 4

Polyol 2—Catalyzed Hybrid Resin Molding Composition

This example outlines the preparation of a urethane-catalyzed hybrid resin composition based on Polyol 2 which contains a low profile additive.

The B-side was prepared using Polyol 2 described in Example 2. To 36.95 g of polyol was added a total of 36.95 g styrene monomer to achieve the target nonvolatile polyol solids content (NVM) of approximately 50%. N,N-diethylaniline (0.44 g) was mixed into the polyol to promote the polyester reaction and p-benzoquinone (0.03 g) was added to delay the initiation of the free radical reaction. The low profile additive was polyvinyl acetate which had a weight-average molecular weight of 80,000 to 100,000: 8.87 g of LPA (solids basis) was added to the polyol. The LPA was usually added as a 40 wt % solution in styrene; the styrene was adjusted to achieve the target NVM for the polyol. A urethane catalyst (0.30 g) was also added to the B-side. A heat-activated, delayed-action co-catalyst based on 1,5-diazabicyclo(5.4.0)undec7-ene was used. This catalyst is available from Air Products and Chemicals, Inc. under the tradename POLYCAT ® SA-102. After mixing the B-side, the sample was allowed to deaerate for 10 minutes.

The A-side was prepared by adding benzoyl peroxide (1.48 g) to PAPI 2027 isocyanate component (1 3.50 g). These weights insured that A-side and B-side would be combined stoichiometrically. The stoichiometric amount was obtained by adding an equal mole equivalent of the polyisocyanate to an equal mole equivalent of polyol such that the ratio of NCO:OH was 1.0.

COMPARATIVE EXAMPLE C

Polyol 2—Hybrid Resin Molding Composition

This example outlines the preparation of a hybrid resin composition based on Polyol 2 which contains a low profile additive but does not contain a urethane catalyst.

The B-side was prepared using Polyol 2 described in Example 2. To 37.06 g of polyol was added a total of 37.06 g styrene monomer to achieve the target nonvolatile polyol solids content (NVM) of approximately 50%. N,N-diethylaniline (0.45 g) was mixed into the polyol to promote the polyester reaction and p-benzoquinone (0.03 g) was added to delay the initiation of the free radical reaction. The low profile additive was polyvinyl acetate which had a weight-average molecular weight of 80,000 to 100,000: 8.89 g of LPA (solids basis) was added to the polyol. The LPA was usually added as a 40 wt % solution in styrene; the styrene was adjusted to achieve the target NVM for the polyol. After mixing the B-side, the sample was allowed to deaerate for 1 0 minutes.

The A-side was prepared by adding benzoyl peroxide (1.48 g) to PAPI 2027 isocyanate component (13.54 g). These weights insured that A-side and B-side would be combined stoichiometrically. The stoichiometric amount was obtained by adding an equal mole equivalent of the polyisocyanate to an equal mole equivalent of polyol such that the ratio of NCO:OH was 1.0.

COMPARATIVE EXAMPLE D

Polyol 2—Polyester (non-Hybrid) Resin Molding Composition

This example outlines the preparation of a unsaturated polyester resin composition based on Polyol 2 which contains a low profile additive but contains no isocyanate component or urethane catalyst.

Comparative Example D was prepared using Polyol 2 described in Example 2. To 42.87 g of polyol was added a total of 42.87 g styrene monomer to achieve the target nonvolatile polyol solids content (NVM) of approximately 50%. N,N-diethylaniline (0.51 g) was mixed into the polyol to promote the polyester reaction and p-benzoquinone (0.03 g) was added to delay the initiation of the free radical reaction. The low profile additive was polyvinyl acetate which had a weight-average molecular weight of 80,000 to 100,000: 10.29 g of LPA (solids basis) was added to the polyol. The LPA was usually added as a 40 wt % solution in styrene; the styrene was adjusted to achieve the target NVM for the polyol. After mixing the polyol composition, the sample was allowed to deaerate for 10 minutes.

The benzoyl peroxide (1.71 g) was added and mixed into the polyol composition immediately prior to molding.

REACTIVITY AND LOW PROFILING BEHAVIOR UNDER MOLDING CONDITIONS

Molding experiments were conducted on a laboratory resin transfer molding (RTM) tool which used an pneumatic cartridge injection system. The mold cavity was 12×12×0.25 inch with an aluminum top and a hardened steel bottom surface. The bottom surface was diamond-polished and chrome-plated; the surface roughness was approximately six microinches ($\mu''$) as measured by a profilometer. With this tool, the surface quality potential of each resin could be accurately determined under actual processing conditions. These experiments were conducted on glass-reinforced systems. One ply of glass surfacing veil was placed on the appearance or bottom surface of the mold and two plies of Certainteed 816 continuous strand glass mat were placed on top of the veil; this arrangement yielded glass contents ranging from about 15 wt. % to about 20 wt %. The molding system was equipped with two external water heating units; therefore, the mold halves could be maintained at isothermal conditions. The mold temperatures were set at 160 and 150 OF with the show surface being the hotter surface. Before closing the mold, a thin wire thermocouple was placed between the two random strand glass mats approximately three inches from the mold edges.

The A and B-sides were prepared separately and allowed to de-aerate. The liquids from sides A and B were premixed for approximately 1.5 to 1.7 minutes prior to being shot into the mold. The resin was injected at 35 psig with a hold pressure of 1 0 to 25 psig. The demold time was 15 minutes. The thermocouple was used to tracking the resin cure. T-max was defined as the maximum temperature reached by the resin during molding: T-rise was the slope of the temperature profile during the curing process and was related to the rate of cure, and t-max was the time after injection that T-max was reached. The mold was also equipped with a pressure transducer on the show surface of the mold. The pressure and temperature of the resin during the cure were recorded using a computerized data acquisition system.

EXAMPLE 5

Surface Appearance Comparison

The low profile-modified systems described in Examples 3 and 4 and Comparative Examples A, B, C, and D were molded under the RTM processing condition described above. The surface appearance results are reported in Table III. The surface appearance of the hybrid panels changed dramatically with the addition of the urethane catalyst. The molded panels from Examples 3 and 4 exhibited high gloss, mirror-like finishes with minimal glass print through: the surface roughness measured less than 12 microinches as determined from profilometer measurements. On the other hand, the uncatalyzed, low profile-modified hybrid systems, Comparative Examples A and C, exhibited a dark tan color with a high concentration of blotchy areas on the surface. These areas had severe glass print-through and left a corresponding resin scum on the mold surface. Furthermore, the uncatalyzed hybrid panels were translucent: a further indication that effective phase separation and low profiling behavior did not occur. Thus, the urethane catalyst improved the surface appearance of the low profile-modified hybrid resin system by improving the low profiling effect and by increasing the isocyanate conversion at the mold surface which minimized mold scumming. The surface appearance of the unsaturated polyester panel molded from Comparative Examples B and D exhibited more glass print-through than the panels made from the catalyzed hybrid panels molded from Examples 3 and 4. This result was unexpected since it was previously thought that unsaturated, non-hybrid, polyester resins could be low profiled but hybrid resins could not be low profiled.

TABLE III

| Resin system | Roughness ($\mu''$) | Surface Appearance |
|---|---|---|
| Example 3 | 12 | yellow, high gloss, opaque |
| Comparative Ex. A | 37 | tan, blotchy areas, translucent |
| Comparative Ex. B | 138 | white, speckled, translucent |
| Example 4 | 9 | yellow, high gloss, opaque |
| Comparative Ex. C | 35 | tan, blotchy areas, translucent |
| Comparative Ex. D | 15 | white, high gloss, opaque |

Surface Appearance Comparison

EXAMPLE 6

Reactivity Comparison

The low profile-modified systems described in Examples 3 and 4 and Comparative Examples A, B, C, and D were molded under the RTM processing condition described above. The reactivity results obtained from monitoring the temperature of the resin during molding are reported in Table IV. The molding experiments conducted at 160°/150° F. show that the Polyol 1-based system reacts faster as an unsaturated polyester resin (Comparative Example B) than as an non-urethane catalyzed hybrid (Comparative Example A). Before this invention, it was generally thought that the hybrid resin reactivity could not exceed the reactivity of the corresponding unsaturated polyester resin system; this was viewed as the major limitation of developing low profiling technology in hybrid resins. The Polyol 1-based, urethane-catalyzed system of Example 3, however, was significantly faster than the unsaturated polyester resin system of Comparative Example B. The rate of temperature rise for Example 3 was approximately 20% faster than Comparative Example B and was 61% faster than the uncatalyzed hybrid of Comparative Example A.

Similar molding results were obtained with the Polyol 2-based systems. The urethane catalyzed system of Example 3 exhibited a rate of temperature rise that was 35% greater than the corresponding unsaturated polyester resin system of Comparative Example D and was 54% faster than the non-urethane catalyzed hybrid of Comparative Example C. Thus, the overall in-mold reactivity for the hybrid resin systems was greatly increased with the use of a urethane catalyst. This improvement in reactivity leads to shorter cycle times, quicker physical property development, and the possibility of using lower mold temperatures compared to non-urethane catalyzed hybrid resins and unsaturated (non-hybrid) resin systems. This molding advantage for the urethane catalyzed, hybrid resin system is not possible for conventional unsaturated polyester resins.

TABLE IV

| Example No. | t-max (s) | T-max (°F.) | T-rise (°F./min) |
|---|---|---|---|
| Example 3 | 86 | 298 | 425 |
| Comparative Example A | 155 | 236 | 165 |
| Comparative Example B | 125 | 280 | 340 |
| Example 4 | 91 | 245 | 155 |

Reactivity Comparison

TABLE IV-continued

| Example No. | Reactivity Comparison | | |
|---|---|---|---|
| | t-max (s) | T-max (°F.) | T-rise (°F./min) |
| Comparative Example C | 162 | 212 | 72 |
| Comparative Example D | 147 | 232 | 115 |

Note:
T-max was the maximum temperature reached during molding; t-max was the time that T-max was reached; and T-rise was the rate of temperature rise during molding and was related to the cure rate.

EXAMPLE 7

Resin Pressure Profile Comparison

The low profile-modified systems described in Examples 3 and 4 and Comparative Examples A, B, C, and D were molded under the RTM processing condition described above. The results obtained from monitoring the pressure of the resin during molding are reported in Table V. The molding experiments were conducted at 160°/150° F. and an injection pressure of 35 psig. After the mold was clamped off the resin exerts a pressure of about 35 psig on the mold and pressure transducer. As the resin starts to cure and transform from a viscous liquid to an elastic solid, the pressure dropped from about 35 psig to less than about 0 psig: this occurrence was referred to as the time of resin solidification. The time of solidification occurred during the early stages of the curing reaction and was related to the overall resin reactivity. For effective low profiling behavior, the pressure should begin to rise after solidification. The rise in pressure corresponds to LPA expansion and this expansion balances the shrinkage caused by the cross-linking: thus, parts were obtained that have no net resin shrinkage, a corresponding absence of glass print-through, and low surface roughness.

For the urethane-catalyzed, low profile-modified hybrid resin based on Polyol 1 (Example 3), solidification occurred much faster than for the corresponding unsaturated polyester resin (Comparative Example B) and also much faster than for the corresponding non-urethane catalyzed hybrid resin (Comparative Example A). These results, reported in Table V, agree with the reactivity results described in Example 6. The catalyzed hybrid (Example 3) exhibited a rapid rise in pressure after solidification; this rise in pressure was caused by the expansion of the resin during the low profiling process. The non-urethane catalyzed hybrid resin (Comparative Example A) and the non-hybrid unsaturated polyester resin (Comparative Example B) did not exhibit any rise in pressure after solidification; consequently, effective low profiling did not occur and the panels exhibited poor surface appearance as was reported in Example 5.

For the urethane-catalyzed, low profile-modified hybrid resin based on Polyol 2 (Example 4), solidification occurred much faster than for the corresponding unsaturated polyester resin (Comparative Example D) and also much faster than for the corresponding non-urethane catalyzed hybrid resin (Comparative Example C). These results, reported in Table V, agree with the reactivity results described in Example 6. Both the urethane-catalyzed hybrid (Example 4) and the non-hybrid unsaturated polyester resin (Comparative Example D) based on Polyol 2, however, exhibited effective white-out behavior as indicated by the increases in pressure after solidification. The rate of pressure rise was significantly faster for the urethane-catalyzed hybrid (Example 4) which indicates that the low profiling was more effective compared to the corresponding non-hybrid unsaturated polyester resin (Comparative Example D); this result agrees with the surface appearance results discussed in Example 5. The non-urethane catalyzed hybrid (Comparative Example C) did not exhibit any rise in pressure; therefore, the surface appearance was inferior to that obtained by the urethane-catalyzed hybrid (Example 4). More effective low profiling behavior in hybrids was obtained by using a urethane catalyst ; this improvement led to a rise in pressure after solidification which resulted in superior surface appearance properties.

TABLE V

| Example No. | Pressure Profile Comparison | | |
|---|---|---|---|
| | Time of Solidification (s) | Time of Expansion (s) | Time Difference (s) |
| Example 3 | 53 | 72 | 19 |
| Comparative Example A | 109 | none | — |
| Comparative Example B | 90 | none | — |
| Example 4 | 55 | 790 | 24 |
| Comparative Example C | 116 | none | — |
| Comparative Example D | 112 | 162 | 50 |

Note:
Solidification was the time when the pressure reaches zero; Expansion was the time when the pressure rises from a negative value to zero; and Difference was the time interval between Solidification and Expansion.

This invention has been described in terms of specific embodiments set forth in detail. It should be understood, however, that these embodiments are presented by way of illustration only, and that the invention is not necessarily limited thereto. Modifications and variations within the spirit and scope of the claims that follow will be readily apparent from this disclosure, as those skilled in the art will appreciate.

That which is claimed is:

1. A polyester-polyurethane hybrid resin molding composition of the present invention formed by contacting:
   (A) an A-side composition comprising a polyfunctional isocyanate compound and a free radical polymerization catalyst and,
   (B) a B-side composition wherein the B-side composition comprises:
      (1) a urethane catalyst, and
      (2) an ethylenically unsaturated monomer solution having dissolved therein from about 40 wt. % to about 90 wt. % based on total B-side, of a substantially water-free, unsaturated polyester polyol which is the reaction product of:
         (a) an unsaturated dicarboxylic acid, dianhydride, anhydride, or derivative thereof, and
         (b) a saturated dicarboxylic acid, dianhydride, anhydride or derivative thereof, in amounts such that the level of unsaturation is greater than about 2.5 moles/Kg wherein the fumarate levels are greater than 95%, and
         (c) a diol composition which is present in a molar excess to achieve a polyol equivalent weight ranging from about 250 to about 1000,
said polyester-polyurethane hybrid resin molding composition further comprising a low profile additive and further wherein the polyol resin composition has an acid number less than five.

2. A process for making polyester-polyurethane resin molding compositions comprising reacting:
  (A) an A-side composition comprising a polyfunctional isocyanate compound and a free radical polymerization catalyst with,
  (B) a B-side composition wherein the B-side composition comprises:
    (1) a urethane catalyst, and
    (2) an ethylenically unsaturated monomer solution having dissolved therein from about 40 wt. % to about 90 wt. % based on total B-side, of a substantially water-free, unsaturated polyester polyol which is the reaction product of:
      (a) an unsaturated dicarboxylic acid, dianhydride, anhydride, or derivative thereof, and
      (b) a saturated dicarboxylic acid, dianhydride, anhydride or derivative thereof, in amounts such that the level of unsaturation is greater than about 2.5 moles/Kg where the fumarate levels are greater than 95%, and
      (c) a diol composition which is present in a molar excess to achieve a polyol equivalent weight ranging from about 250 to about 1000,
said polyester-polyurethane hybrid resin molding composition further comprising a low profile additive and further wherein the polyol resin composition has an acid number less than five.

3. A polyester-polyurethane hybrid resin molding system comprising:
  (A) an A-side composition comprising a polyfunctional isocyanate compound and a free radical polymerization catalyst with,
  (B) a B-side composition wherein the B-side composition comprises:
    (1) a urethane catalyst, and
    (2) an ethylenically unsaturated monomer solution having dissolved therein from about 40 wt. % to about 90 wt. % based on total B-side, of a substantially water-free, unsaturated polyester polyol which is the reaction product of:
      (a) an unsaturated dicarboxylic acid, dianhydride, anhydride, or derivative thereof, and
      (b) a saturated dicarboxylic acid, dianhydride, anhydride or derivative thereof, in amounts such that the level of unsaturation is greater than about 2.5 moles/Kg wherein the fumarate levels are greater than 95%, and
      (c) a diol composition which is present in a molar excess to achieve a polyol equivalent weight ranging from about 250 to about 1000,
said polyester-polyurethane hybrid resin molding composition further comprising a low profile additive and further wherein the polyol resin composition has an acid number less than five.

4. The polyester-polyurethane hybrid resin molding composition of claim 1 further including a promoter for vinyl polymerization.

5. The polyester-polyurethane hybrid resin molding composition of claim 1 further including fillers.

6. The polyester-polyurethane hybrid resin molding composition of claim 1 including additives in addition to the low profile additive.

7. The polyester-polyurethane hybrid resin molding composition of claim 1 wherein the low profile additive is added to the A-side composition.

8. The polyester-polyurethane hybrid resin molding composition of claim 1 wherein the saturated dicarboxylic acid, dianhydride, anhydride or derivative thereof is in amounts such that the level of unsaturation is from about 4.0 moles/Kg to about 5.5 moles/Kg.

9. The polyester-polyurethane hybrid resin molding composition of claim 1 wherein the polyol has an equivalent weight ranging from about 250 to about 1000.

10. A composition useful in the preparation of a polyester-polyurethane hybrid resin, the composition comprising (A) a urethane catalyst, and (B) an ethylenically unsaturated monomer solution having dissolved therein from about 40 weight percent to about 90 weight percent, based on the total weight of the composition, of a substantially water-free, unsaturated polyester polyol which is the reaction production of:
  1. an unsaturated dicarboxylic acid, dianhydride, anhydride, or derivatives thereof, and
  2. a saturated dicarboxylic acid, dianhydride, anhydride, and derivatives thereof, in amounts such that the level of unsaturation is greater than about 2.5 moles/Kg polyol wherein the fumarate levels are greater than 95%, and
  3. a diol composition which is present in a molar excess to achieve a polyol equivalent weight ranging from about 250 to about 1000,
the polyol resin composition having an acid number less than five.

* * * * *